US006636883B1

United States Patent
Zebrowski, Jr.

(10) Patent No.: US 6,636,883 B1
(45) Date of Patent: Oct. 21, 2003

(54) MECHANISM FOR PASSING INFORMATION BETWEEN QUEUING AND DE-QUEUING PROCESSES

(75) Inventor: Edward Zebrowski, Jr., Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/255,247

(22) Filed: Feb. 22, 1999

(51) Int. Cl.[7] ................................................. G06F 9/00
(52) U.S. Cl. ...................................... 709/102; 710/200
(58) Field of Search ................................ 709/100–108, 709/200–253; 710/200

(56) References Cited

U.S. PATENT DOCUMENTS

| | | | | |
|---|---|---|---|---|
| 4,320,455 A | * | 3/1982 | Woods et al. ................ | 710/200 |
| 5,224,215 A | * | 6/1993 | Disbrow ...................... | 709/234 |
| 5,367,643 A | * | 11/1994 | Chang et al. .................. | 710/62 |
| 5,428,781 A | * | 6/1995 | Duault et al. ................. | 709/102 |
| 5,485,626 A | * | 1/1996 | Lawlor et al. ................ | 709/315 |
| 5,588,132 A | * | 12/1996 | Cardoza ...................... | 711/148 |
| 5,606,666 A | * | 2/1997 | Grant et al. .................. | 709/216 |
| 6,029,205 A | * | 2/2000 | Alferness et al. ............ | 709/310 |
| 6,247,064 B1 | * | 6/2001 | Alferness et al. ............ | 709/312 |
| 6,480,918 B1 | * | 11/2002 | McKenney et al. ......... | 710/200 |

* cited by examiner

*Primary Examiner*—St. John Courtenay, III
*Assistant Examiner*—Phuong Hoang
(74) *Attorney, Agent, or Firm*—Duke W. Yee; Jerry W. Herndon; Stephen R. Tkacs

(57) ABSTRACT

The invention improves communications between a queuing process and a dequeuing process. Elements are linked and unlinked from the queue using a special locking instruction that guarantees serialized operations. The queue structure includes a synchronization field that is used to pass information between the queuing process and the dequeuing process and which is also used by the locking instruction to guarantee serialized operation. The dequeuing process writes information into the synchronization field for the queuing process. The queuing process reads and acts on the information in the synchronization field. In the preferred embodiment, the information passed between the queuing and dequeuing processes allows the processes to control the initiation and termination of dequeuing processes. When the dequeuing process removes an element from the queue, it sets the synchronization field to a first or second state, depending on whether the queue is empty or not empty, respectively. If the queue is empty, the dequeuing process also terminates itself. When the queuing process next links an element into the queue, if the synchronization field is set to the first state, the queuing process initiates a new dequeuing process.

14 Claims, 3 Drawing Sheets

MECHANISM FOR PASSING INFORMATION BETWEEN QUEUING AND DE-QUEUING PROCESSES

TECHNICAL FIELD

The invention relates generally to the field of computing and specifically to communications between queuing and de-queuing processes in high-throughput systems

BACKGROUND OF THE INVENTION

Efficient queuing mechanisms are vital for the operation of today's high-speed, high-throughput computing systems. This is especially true for such systems that are used in networking environments where arriving queue elements can number in the thousands and tens of thousands per second. In a simple single processor, multi-tasking system, a typical queuing mechanism consists of one or more queuing processes that can add elements to a queue, and one de-queuing process that removes elements from the queue for processing. Even in such a system, because elements are typically queued while enabled for interruptions, it is necessary to serialize queuing and de-queuing operations to avoid interference between different queuing processes and between these processes and the de-queuing process. In multi-processor systems involving shared queues, the serialization problem becomes even more acute, because different processors may be attempting to access the same shared memory at the same time. The serialization problem and the need for high-speed, high-throughput systems have resulted in the development of specialized computer instructions that perform queue and de-queue operations in a serialized manner, all within the operation of a single computer instruction. For example, the IBM System 390 architecture provides a Perform Locked Operation (PLO) instruction. This instruction has several functions, including Compare and Load, Compare and Swap, Compare, Swap and Store. Within these functions are additional variations, such as single or double memory word operations. Briefly, the PLO instruction operates as follows. A program lock token (PLT), which identifies a shared memory location, is placed in general register 1. A PLO function code that specifies the specific PLO function is placed in general register 0. The PLO instruction is then executed, which locks the shared memory location identified by the PLT and then performs the specified PLO operations on the shared memory locations. The PLT allows locking and lock recognition between different processes in a single CPU and between different CPUs. FIG. 1 shows the configuration of a typical System/390 mainframe system 100, containing multiple CPUs 102, 104, 106 and 108, all of which have access to a shared memory 110. The shared memory 110 may contain a queue structure, such as illustrated in FIG. 2. A typical queue structure consists of a queue 200 that contains the data elements in the queue, and a queue header 202. The queue header typically contains a head pointer 210 (QHEAD) that points to the top of the queue and a tail pointer 212 (QTAIL) that points to the bottom of the queue. Arriving data elements are typically placed at the shared memory location pointed to by the QTAIL pointer and data elements are serviced from the queue by removing them from the shared memory location pointed to by the QHEAD pointer. In the illustrative example of FIG. 2, the queue header also contains a sequence number (SEQ. #) field 204 and a COUNT field 208. The SEQ # field contains a numerical value that is incremented each time an operation is performed on the queue header. The COUNT field contains a numerical value of the number of data elements in the queue at any given time.

FIG. 3 shows a temporary memory structure 300 (called a parameter list) that is used by the PLO instruction. The parameter list 300 contains a OP1CV field 302 (operand 1 compare value), a OP1RV field 304 (operand 1 replacement value) and two other fields OP3 306 and OP4 308, which are used by the PLO. The parameter list contains other parameters not shown in FIG. 3. However, for the purpose of this disclosure, it is unnecessary to discuss these other parameter list words. Reference is made to the IBM document in the next paragraph for complete details.

A typical application of the PLO instruction is to administer queues. Because the PLO instruction is conventional, its detailed operation is not described here. A complete description of the instruction is contained in IBM Document Number SA22-720 1-xx, where xx represents a version number. The present version is xx=04. This document is incorporated by reference herein.

A simplified operation of the PLO instruction is now described with reference to a function of operation (function code 13) that assumes that a data element is to be inserted into an empty queue. Skilled art workers are capable of selecting other modes of operation of the PLO instruction for other situations of the queue. Reference is made to the above IBM document SA22-720 1 for this purpose. Single word operations of PLO are also ignored. For purposes here, it can be assumed that all of the operations mentioned are double word operations. PLO13 is referred to as the Compare and Swap and Store operation. To insert a new data element into an empty queue 200, OP1CV is set to the present value of Header 0 and both the left and right word portions of parameter list double word OP3 is set to the address in shared memory 110 where the new element to be queued is located. OP4 in the parameter list is set to the address of Header 1. The SEQ # and COUNT fields in the replacement value word OP1RV of the parameter list are set to their corresponding OP1CV values incremented by 1, and finally general register 1 is also set to the value of the PLT (the program lock token) corresponding to the portion of shared memory that contains the queue and queue header. The PLO instruction is executed. The queue and queue header portions of shared memory are locked as a result of the PLT in general register 1. Next, OP1CV is compared to HEADER 0. If they match, this means that the queue and header were not changed by another process during the setup process just prior to the execution of PLO13. This means that it is safe to proceed to modify the queue structure. In this event, Header 0 in the queue header is set equal to OP1RV and Header 1 is set equal to OP3. These operations update the queue structure so that the new element is now inserted. The PLT lock is released and execution of the PLO instruction is complete. If the comparison of OP1CV and HEADER 0 did not match, the above process would repeat until such time as these values match, at which time the new data element would be inserted as described.

The above described conventional procedure allows for the convenient administration of a queue. However, it does not provide any mechanism for communicating between the queuing process and a dequeuing process. For example, for efficient operation, it may be desirable to turn off a dequeuing process when a queue is empty and to turn it back on when necessary. This can be done separately with additional code or, in the IBM System 390 architecture, by activating an SRB (schedule resource block) process when a data element is inserted into a queue. Both methods are inefficient and undesirable. In the former case, additional code execution consumes precious CPU cycles in a high volume, high through-put system. In the latter case, each SRB that is activated initiates another dequeuing process, which consumes CPU resources and which may be unnecessary

SUMMARY OF THE INVENTION

The invention solves the problem of improving efficient communications between a queuing process and a dequeuing process. The queue structure includes a synchronization field that is used to pass information between the queuing process and the dequeuing process. An element is linked into the queue by storing into a parameter list information representing the present state of the queue, including the synchronization field, sufficient to determine if the queue changes and by then locking the queue to other processes. While the queue is locked, the state of the queue and the synchronization field are compared to the state of the queue and synchronization field contained in the parameter list. If the comparison matches, the element is linked into the queue and the queue is unlocked. If an element is successfully linked into the queue, then information from a dequeuing process contained in the synchronization field is obtained and acted on. An element is unlinked from the queue by a dequeuing process by storing in the parameter list the same queue information and synchronization field sufficient to determine if the queue changes and then locking the queue to other processes. The state of the queue and the synchronization field after locking are compared to the state of the queue and synchronization field contained in the parameter list. If the comparison matches, an element is unlinked from the queue. The queue is then unlocked. If an element is successfully unlinked from the queue, then the dequeuing process writes information into the synchronization field for the queuing process to act on.

In the preferred and disclosed embodiment, a special locking instruction is used to perform the linking and unlinking operations, each in a single locking instruction. This further improves the efficiency of communicating between the queuing and dequeuing processes. Also in the preferred embodiment, the information passed between the queuing and dequeuing processes allows the processes to control the initiation and termination of dequeuing processes. When the dequeuing process removes an element from the queue, the dequeuing process sets the synchronization field to a first or second state, depending on whether the queue is empty or not empty, respectively. If the queue is empty, the dequeuing process also terminates itself. When the queuing process next links an element into the queue, it reads the synchronization field as part of the serialized queuing operation. If the synchronization field is set to the first state, the queuing process initiates a new dequeuing process.

DETAILED DESCRIPTION

Figure 1:
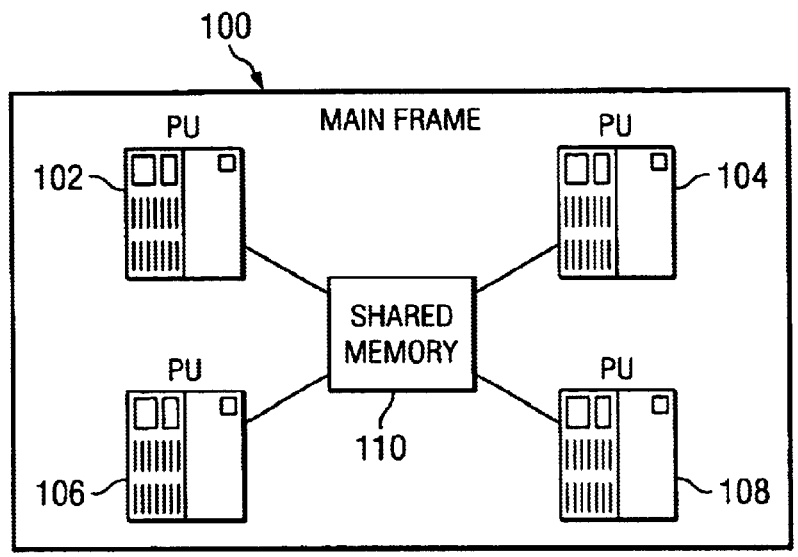
FIG. 1 shows a block diagram of an illustrative mainframe computer system in which the invention can be practiced, the computer system containing multiple processing units (CPUs) and a shared memory accessible by the CPUs.
Figure 2:
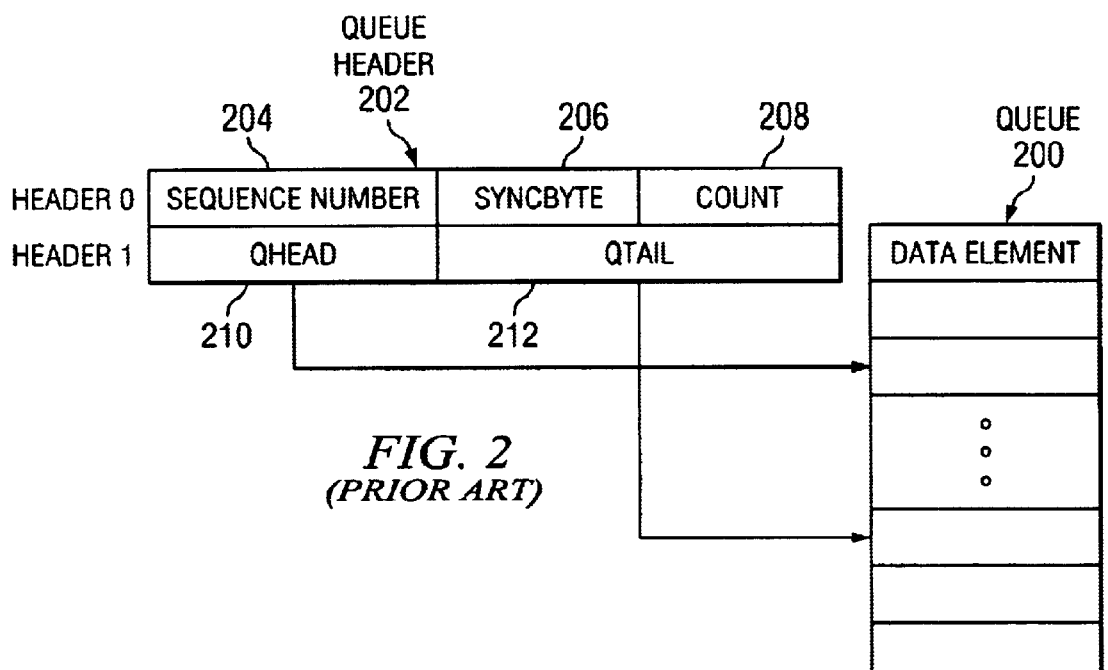
FIG. 2 shows an illustrative queue structure, including a SYNCBYTE field in the queue header that is used in the preferred embodiment to pass information between queuing and dequeuing processes in accordance with the invention.
Figure 3:
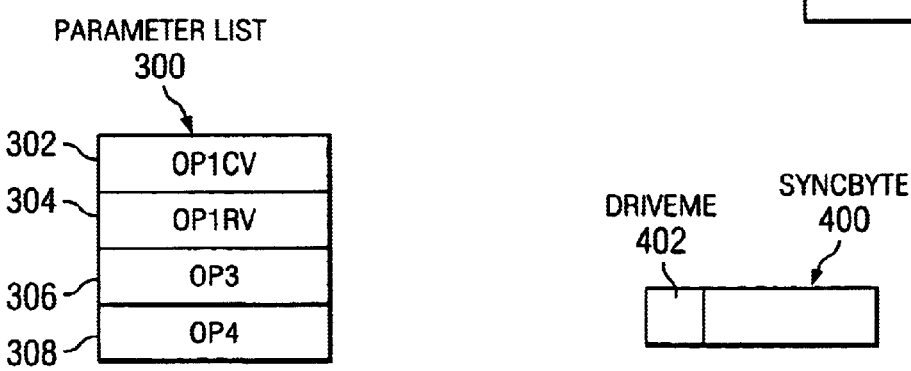
FIG. 3 shows a block of scratch memory, called a parameter list, which is used by an instruction to perform serialized queue operations.

FIG. 1 and the conventional fields of a queue structure, as shown in FIG. 2, have already been adequately discussed. The purpose of the scratch block of memory called the parameter list in FIG. 3 has also been discussed. Skilled artisans in the field of queuing are well versed with these conventional details of queue structures. The parameter list is discussed in more detail below in conjunction with a more detailed discussion of the operation of the PLO instruction.

Figure 4:
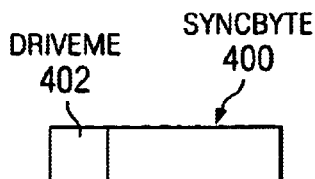
FIG. 4 shows further details of the SYNCBYTE field of FIG. 2.

In accordance with the invention, the illustrative queue header shown in FIG. 2 also contains a SYNCBYTE field 206 in the header 0 word of the queue header. This field is used to communicate between queuing and dequeuing processes during operation of the PLO instruction. The PLO instruction conveniently performs queuing and dequeuing operations, while guaranteeing serialization of these operations to prevent interference between the processes and corruption of the queue. FIG. 4 shows further details of the SYNCBYTE field. The SYNCBYTE field can be used for many communication purposes. However, in the preferred embodiment, only one purpose is presently contemplated. That is to conveniently and efficiently control the activation and deactivation of dequeuing processes, depending on whether or not the queue is empty. A DRIVEME bit 402, contained in the SYNCBYTE field is used for this purpose. In the preferred embodiment, if a dequeuing process is already active at the time an element is added to the queue, no further dequeuing process is activated by the queuing process. The presently active dequeuing process is deemed adequate to eventually process the new element. When the dequeuing process removes the last element from the queue, the dequeuing process sets the DRIVEME bit to a state such that the next time an element is added to the queue the queuing process activates a dequeuing process to process the element. The present dequeuing process then terminates. This guarantees efficient operation in that a dequeuing process is not active when there is no need. In IBM OS/390 parlance, scheduling a dequeuing process may be performed by scheduling a service request block, or SRB.

The above scheduling of a dequeuing process either retains or terminates a single dequeuing process, depending on the non-empty or empty state of the queue. It should be noted, however, that more sophisticated schemes can also be used, if desired. For example, in some cases, it might be deemed more efficient to activate a number of dequeuing processes, depending on the number of elements in the queue to be processed. The DRIVEME bit can be used for this purpose, if desired, in an obvious manner.

Figure 5:
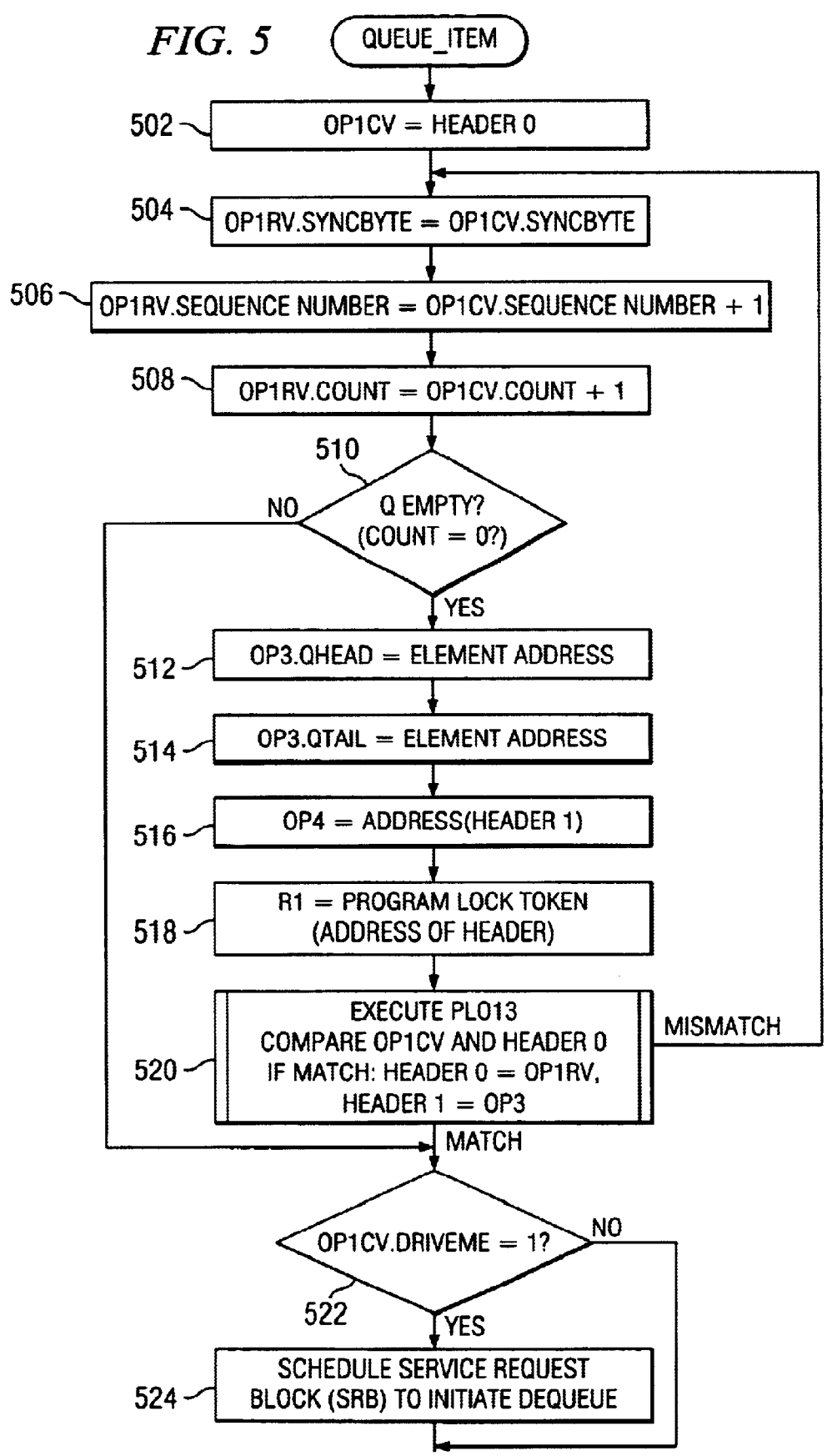
FIGS. 5 and 6 show illustrative flowcharts of queuing and dequeuing operations of the preparation and execution of the instruction that performs serialized queue operations, including the operations for communicating between queuing and dequeuing processes during execution of the instruction in accordance with the invention.

FIG. 5 shows an illustrative flowchart of a queuing process that uses the DRIVEME bit to schedule a dequeuing process or not in accordance with whether a dequeuing process is already active. It is important to understand that, in accordance with the invention, the passing of the state of the DRIVEME bit between the queuing and dequeuing process occurs automatically during the operation of the PLO instruction and thus incurs no additional penalty on processing resources. When an element arrives for insertion into the queue, initial operations are to setup the parameter list for the PLO instruction. OP1CV of the parameter list is intended to contain a comparison value for the PLO instruction. OP1RV of the list is intended to contain a replacement value in the event the PLO instruction is successful. Step 502 sets OP1CV to the present value of Header 0 of the queue header. Thus, OP1CV now contains the present values of the SEQ # 204, SYNCBYTE 206 and COUNT 208. Step 504 sets the SYNCBYTE portion of OP1RV to the value of SYNCBYTE contained in OP1CV. Step 506 sets the SEQ # field in OP1RV to the value of the SEQ # field in OP1CV plus 1. Step 508 sets the COUNT field of OP1RV to the value of the COUNT field in OP1CV plus 1. These operations initialize the value of the sequence number and the queue element count for storage in OP1RV in the event this PLO operation eventually succeeds. The PLO instruction will succeed if no other process modifies the queue or header from the beginning of step 502 to the execution of the PLO at step 520. Next, step 510 examines the COUNT field in OP1CV to determine if the queue is presently empty. Only the queue empty state is discussed in detail here. This is deemed sufficient to describe the operation of the invention. The operations required to link a new element to a non-empty queue are well known to skilled queue artisans. Thus, assuming the queue is empty, it is necessary to set the QHEAD and QTAIL pointers 210 and 212 to point to the new element in the queue if PLO succeeds. Steps 512 and 514 set the QHEAD and QTAIL portions of the OP3 word of the parameter list accordingly. Step 514 sets word OP4 of the parameter list to the address of Header 1 of the queue header. Finally, step 518 sets a register R1 to the value of a Program Lock Token (PLT). The PLT is used by the PLO to insure serialization of queue operations, i.e., that multiple will not be performed simultaneously. In the preferred embodiment, the PLT is always equal to the address of the queue header of the queue in question. All CPUs and processes in the system use the same PLT for a specific queue to guarantee serialization. Values of a PLT other than the address of a queue header could be used if desired.

At this point the parameter list is completely setup and the PLO instruction is executed at step 520. Because an element is being added to an empty queue, a mode 13 of the PLO instruction is used. Other modes would be used for other situations, as could be determined by a skilled artisan.

The PLO instruction first locks the queue according to the PLT contained in the parameter list. Next it compares the values contained in OP1CV and Header 0 of the queue. They will match if no other process has modified the queue since the beginning of step 502 and the locking of the queue. If these values mismatch, the PLO instruction fails and control is branched to step 504 to begin this queuing operation from the beginning with respect to the present state of the queue. Assuming, however, that the PLO succeeds, the PLO sets header 0 of the queue header to the value contained in OP1RV and it sets HEADER 1 to the value of parameter list field OP3. This completely updates the queue so that the new element is added to the queue. PLO now removes the PLT lock on the queue structure.

Now in accordance with the invention, step 522 determines if a dequeuing process should be scheduled. Step 522 examines the state of the DRIVEME bit in OP1CV. If DRIVEME is set to 0, there is already a dequeuing process active and there is no need to schedule another. In this event, the queuing process is finished and merely exits. If DRIVEME is set to 1, this means that a dequeuing process has earlier terminated upon dequeuing the last item in the queue and requested that a new dequeuing process be activated the next time an element is added to the queue. In this event, step 524 takes the necessary action to schedule this new dequeuing process.

Figure 6:
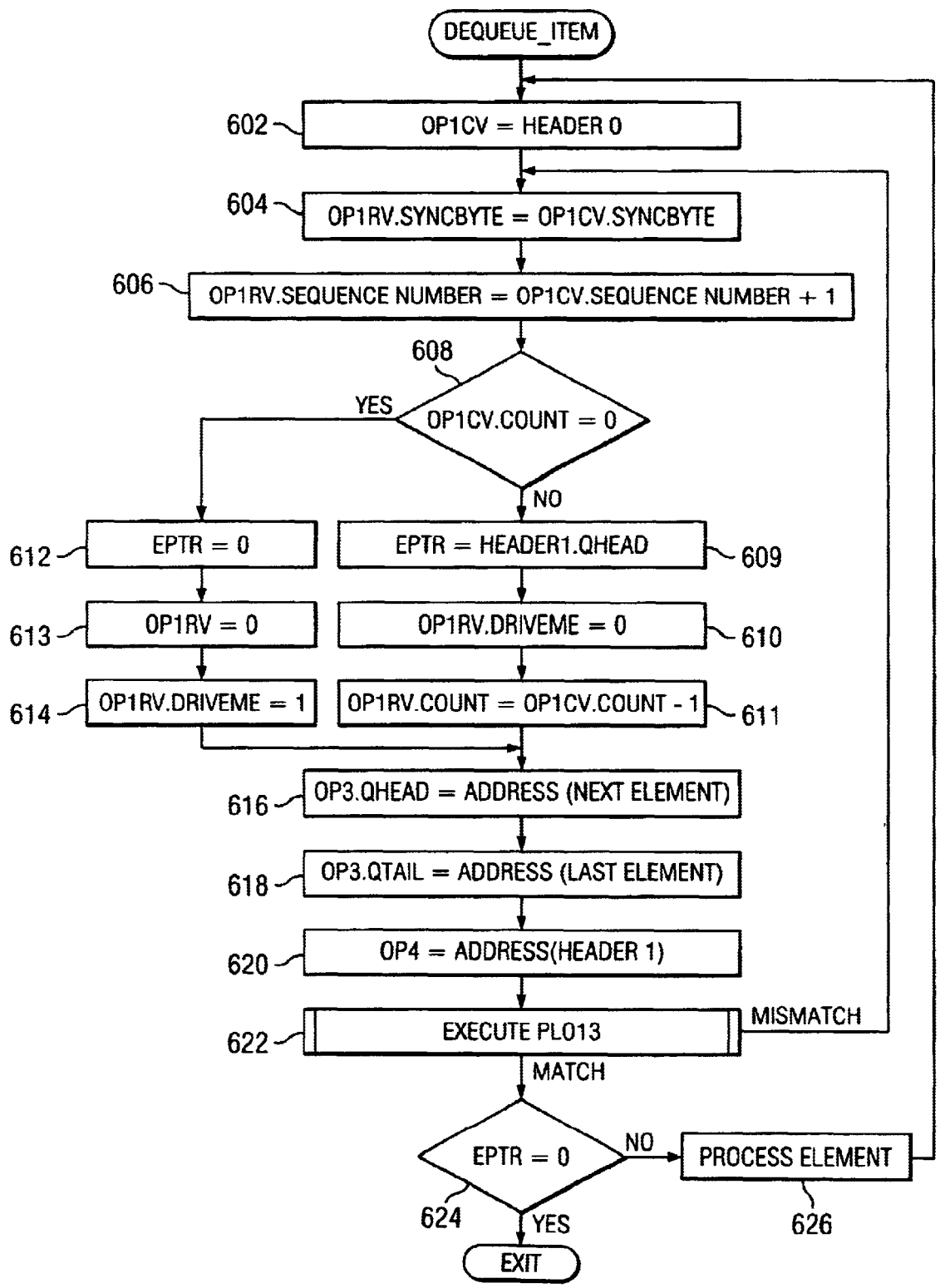

FIG. 6 shows illustrative steps of a dequeuing process. These operations will be described more briefly than above, as operation of the PLO instruction should now be understood. The dequeuing process is entered on a scheduled basis while the process is active. Step 602 sets OP1CV to the value of Header 0. Similarly, steps 604 and 606 set up the correct values of OP1RV for the SYNCBYTE, SEQ # and COUNT fields. Step 608 determines from the COUNT field of OP1CV if the queue is presently empty. If the queue is empty, it is still necessary in this embodiment to execute a PLO instruction to update DRIVEME in the SYNCBYTE field of HEADER 0. However, an indication that the PLO will not actually remove any element from the queue in this case is required. For this purpose, if the queue is empty, step 612 sets a memory word EPTR to 0 to remember this fact. Step 613 sets OP1RV to 0. Since the queue is empty, the present dequeuing process will terminate after the next PLO instruction. Therefore, step 614 sets DRIVEME in the replacement word to 1 to communicate to the queuing process to schedule an SRB after the next element is added to the queue to initiate a new dequeuing process. If the queue is not empty at step 608, step 609 sets EPTR to the value of QHEAD in HEADER 1. This is a non-zero value and serves to remember the fact that the queue is not presently empty. The present dequeuing process will not terminate after the next PLO instruction. Therefore, step 610 sets DRIVEME in the replacement word to zero to communicate to the queuing process that it is unnecessary to schedule an SRB after the next queuing operation. Step 611 further prepares for the next PLO instruction by setting the COUNT value of the replacement word OP1RV to the value in OP1CV minus 1. Next, steps 616, 618 and 620 complete the initialization of the parameter list for operation of the PLO instruction. PLO function mode 13 is executed at step 622. If the queue structure has been modified since the beginning of this dequeuing operation at step 604, the PLO will mismatch on its comparison of OP1CV and HEADER 0. If this occurs, control is returned to step 604 to re-initiate this operation with respect to the present state of the queue. If the queue structure has not been modified since the beginning of step 604, a match will occur and the PLO instruction will update the queue structure to remove the next element, if any, from the queue. In the same locked PLO operation, the DRIVEME flag in SYNCBYTE of the replacement word OP1RV is updated in HEADER 0 of the queue. After a successful execution of the PLO instruction, step 624 interrogates the value of EPTR. If the value is non-zero, an element was actually removed from the queue by the PLO instruction and this dequeuing process remains active. This is conceptually illustrated at step 626, where the dequeued element is processed and operation functionally continues at step 602 to dequeue another element. In actual practice, this might be a subsequent periodic entry to DEQUEUE_ITEM. If EPTR is zero at step 624, the queue was empty before the PLO instruction. Therefore, this process terminates by exiting at 626. In this event, it is recalled that DRIVEME in HEADER 0 is now updated to 1 by the PLO instruction so that the queuing process will initiate another dequeuing process when an element is next added to the queue. This completes the dequeuing operation.

It is to be understood that the above described arrangements are merely illustrative of the application of principles of the invention and that other arrangements may be devised by workers skilled in the art without departing from the spirit and scope of the invention.

What is claimed:

1. A method of communicating information between a queuing process and a dequeuing process in a computer system comprising a memory and one or more central processing units each capable of executing multiple processes simultaneously and each having access to a queue in memory, the method comprising:
   a) linking an element into the queue by
      1) storing the present state of the queue including a synchronization field into a parameter list,
      2) locking the queue to other processes,
      3) comparing the state of the queue and the synchronization field after locking to the state of the queue and synchronization field contained in the parameter list;
      4) if the comparison in step a3) matches,
         i) linking the element into the queue,
         ii) unlocking the queue, and
         iii) obtaining information from a dequeuing process contained in the synchronization field and action on it, and
   b) unlinking an element from the queue by
      1) storing the present state of the queue including the synchronization field into a parameter list,
      2) locking the queue to other processes,
      3) comparing the state of the queue and the synchronization field after locking to the state of the queue and synchronization field contained in the parameter list,
      4) if the comparison in step b3) matches,
         i) unlinking the element from the queue,
         ii) unlocking the queue, and
         iii) writing information into the synchronization field for a queuing process to act on.

2. The method of claim 1 wherein the dequeuing process sets the synchronization field to a first state and terminates itself if the queue is empty after an element is unlinked from the queue, and the queuing process initiates a new dequeuing process if the synchronization field is set to the first state after an element is linked to the queue.

3. A method of communicating information between a queuing process and a dequeuing process in a computer system comprising a memory and one or more central processing units each capable of executing multiple processes simultaneously and each having access to a queue in memory, the method comprising
   a) executing a queuing process that performs the steps of
      1) preparing a parameter list with information representing the present state of the queue, including a synchronization field for communicating information between the queuing and dequeuing processes, for linking an element into the queue,
      2) executing a locking instruction for linking the element into the queue, wherein the locking instruction
         i) locks the queue to other processes,
         ii) compares the state of the queue and the synchronization field after locking to the state of the queue and synchronization field contained in the parameter list to insure that the queue has not changed,
         iii) links the element into the queue using the parameter list if the state of the queue has not changed, and
         iv) unlocks the queue, the queuing method further comprising
      3) obtaining information representing the status of the dequeuing process from the synchronization field if the instruction is successful in linking the element into the queue, and
   b) executing a dequeuing process that performs the steps of
      1) preparing the parameter list with information representing the present state of the queue, including the synchronization field, for unlinking an element from the queue,
      2) executing the locking instruction for unlinking the element from the queue, and
      3) writing status information into the synchronization field if the instruction is successful in unlinking an element from the queue.

4. The method of claim 3 wherein the synchronization field contains a DRIVEME indication and wherein
   the step of b3) further comprises
      setting the DRIVEME indication to a first state or a second state by the dequeuing process if the queue is empty or not empty, respectively, after successfully unlinking an element from the queue, and
      terminating the dequeuing process if the queue is empty, and
   the step of a3) further comprises
      initiating a new dequeuing process by the queuing process if the DRIVEME indication is set to the first state after successfully linking an element into the queue.

5. Apparatus for communicating information between a queuing process and a dequeuing process in a computer system comprising a memory and one or more central processing units each capable of executing multiple processes simultaneously and each having access to a queue in memory, the method comprising
   a) means for linking an element into the queue, including
      1) means for storing the present state of the queue, including a synchronization field, in a parameter list,
      2) means for locking the queue to other processes,
      3) means for comparing the state of the queue and the synchronization field after locking to the state of the queue and synchronization field contained in the parameter list,
      4) means responsive to a match condition of the comparing means for linking the element into the queue,
      5) means responsive to a match condition of the comparing means for unlocking the queue,
      6) means responsive to a match condition of the comparing means for obtaining information from a dequeuing process contained in the synchronization field and acting on it, and
   b) means for unlinking an element from the queue, including
      1) means for storing the present state of the queue, including the synchronization field, into a parameter list,
      2) means for locking the queue to other processes,
      3) means for comparing the state of the queue and the synchronization field after locking to the state of the queue and synchronization field contained in the parameter list,
      4) means responsive to a match condition of the comparing means in b3) for unlinking the element from the queue,
      5) means responsive to a match condition of the comparing means in b3) for unlocking the queue, and
      6) means responsive to a match condition of the comparing means in b3) for writing information into the synchronization field for a queuing-process to act on.

6. The apparatus of claim 5 wherein the means b6) further includes means for determining if the queue is empty after unlinking an element from the queue, means responsive to the determining means for setting the synchronization field to a first state, and means responsive to the determining means for terminating the dequeuing process if the queue is empty, and wherein the a6) means further comprises means for initiating a new dequeuing process if the synchronization field is set to the first state after an element is linked to the queue.

7. Apparatus for communicating information between a queuing process and a dequeuing process in a computer system comprising a memory and one or more central processing units each capable of executing multiple processes simultaneously and each having access to a queue in memory, comprising a) a parameter list b) means for queuing an element into the queue, including
  1) means for copying into the parameter list queue information, including a synchronization field for communicating between the queuing and dequeuing processes, sufficient to determine if the queue has changed,
  2) means for executing a locking instruction for linking the element into the queue, wherein the locking instruction
    i) locks the queue to other processes,
    ii) compares the state of the queue and the synchronization field after locking to the information contained in the parameter list to determine if the queue has changed,
    iii) links the element into the queue if the queue has not changed, and
    iv) unlocks the queue the queuing means further comprising
  3) means responsive to a successful linking of an element into the queue for obtaining and acting on information in the synchronization field, and b) means for unlinking an element from the queue, including
  1) means for copying into the parameter list queue information, including the synchronization field, sufficient to determine if the queue has changed,
  2) means for executing the locking instruction for unlinking the element from the queue,
  3) means responsive to a successful unlinking of the element from the queue for writing status information into the synchronization field for the queuing process.

8. The apparatus of claim 7 wherein the synchronization field contains a DRIVEME indication and the dequeuing means further comprises means for setting the DRIVEME indication to a first state or a second state if the queue is empty or not empty, respectively, after successfully unlinking an element from the queue, and means for terminating the dequeuing process if the queue is empty, and wherein the queuing means further comprises means for initiating a new dequeuing process if the DRIVEME indication is set to the first state after successfully linking an element into the queue.

9. A computer program embodied on a computer-readable medium for communicating information between a queuing process and a dequeuing process in a computer system comprising a memory and one or more central processing units each capable of executing multiple processes simultaneously and each having access to a queue in memory, the program comprising a) a code segment for executing a locking instruction to link an element into the queue, wherein the locking instruction
  1) stores the present state of the queue, including a synchronization field into a parameter list,
  2) locks the queue to other processes,
  3) compares the state of the queue and the synchronization field after locking to the state of the queue and synchronization field contained in the parameter list,
  4) and if the comparison in a3) matches,
    i) links the element into the queue, and
    ii) unlocks the queue, b) a code segment responsive to a successful linking of an element into the queue for obtaining information from a dequeuing process contained in the synchronization field and acting on it, and c) a code segment for executing the locking instruction to unlink an element from the queue, and d) a code segment responsive to a successful unlinking of an element from the queue for writing information into the synchronization field for the queuing process to act on.

10. The computer program of claim 9 wherein the code segment for unlinking an element from the queue further comprises a code segment for setting the synchronization field to a first state and for terminating the code segment for unlinking if the queue is empty after an element is unlinked from the queue, and the code segment for linking an element into the queue further comprises a code segment for initiating a new dequeuing process if the synchronization field is set to the first state after an element is linked to the queue.

11. A computer program embodied in a carrier wave for communicating information between a queuing process and a dequeuing process in a computer system comprising a memory and one or more central processing units each capable of executing multiple processes simultaneously and each having access to a queue in memory, the program comprising a) a code segment for executing a locking instruction to link an element into the queue, wherein the locking instruction
  1) stores the present state of the queue, including a synchronization field into a parameter list,
  2) locks the queue to other processes,
  3) compares the state of the queue and the synchronization field after locking to the state of the queue and synchronization field contained in the parameter list,
  4) and if the comparison in a3) matches,
    i) links the element into the queue, and
    ii) unlocks the queue, b) a code segment responsive to a successful linking of an element into the queue for obtaining information from a dequeuing process contained in the synchronization field and acting on it, and c) a code segment for executing the locking instruction to unlink an element from the queue, and d) a code segment responsive to a successful unlinking of an element from.the queue for writing information into the synchronization field for the queuing process to act on.

12. The computer program of claim 11 wherein the code segment for unlinking an element from the queue further comprises a code segment for setting the synchronization field to a first state and for terminating itself if the queue is empty after an element is unlinked from the queue, and the code segment for linking an element into the queue further comprises a code segment for initiating a new dequeuing process if the synchronization field is set to the first state after an element is linked to the queue.

13. A method of communicating information between a queuing process and a dequeuing process in a computer system comprising a memory and one or more central processing units each capable of executing multiple processes simultaneously and each having access to a queue in memory, the method comprising:

linking an element into the queue by
  a) storing the present state of the queue including a synchronization field into a parameter list,
  b) locking the queue to other processes,
  c) comparing the state of the queue and the synchronization field after locking to the state of the queue and synchronization field contained in the parameter list;
  d) if the comparison in step c) matches,
    i) linking the element into the queue,
    ii) unlocking the queue, and
    iii) obtaining information from a dequeuing process contained in the synchronization field and action on it.

14. A method of communicating information between a queuing process and a dequeuing process in a computer system comprising a memory and one or more central processing units each capable of executing multiple processes simultaneously and each having access to a queue in memory, the method comprising:

unlinking an element from the queue by
  a) storing the present state of the queue including a synchronization field into a parameter list,
  b) locking the queue to other processes,
  c) comparing the state of the queue and the synchronization field after locking to the state of the queue and synchronization field contained in the parameter list,
  d) if the comparison in step c) matches,
    i) unlinking the element from the queue,
    ii) unlocking the queue, and
    iii) writing information into the synchronization field for a queuing process to act on.

* * * * *